(12) United States Patent
Xu et al.

(10) Patent No.: US 9,009,134 B2
(45) Date of Patent: Apr. 14, 2015

(54) NAMED ENTITY RECOGNITION IN QUERY

(75) Inventors: Gu Xu, Beijing (CN); Hang Li, Beijing (CN); Jiafeng Guo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 804 days.

(21) Appl. No.: 12/725,342

(22) Filed: Mar. 16, 2010

(65) Prior Publication Data

US 2011/0231347 A1    Sep. 22, 2011

(51) Int. Cl.
    *G06F 17/30*    (2006.01)
(52) U.S. Cl.
    CPC ............................ *G06F 17/30864* (2013.01)
(58) Field of Classification Search
    None
    See application file for complete search history.

(56) References Cited

U.S. PATENT DOCUMENTS

| | | | |
|---|---|---|---|
| 2007/0208730 A1* | 9/2007 | Agichtein et al. | 707/5 |
| 2007/0233656 A1* | 10/2007 | Bunescu et al. | 707/3 |
| 2007/0239735 A1* | 10/2007 | Glover et al. | 707/10 |
| 2008/0005090 A1 | 1/2008 | Khan et al. | |
| 2008/0052262 A1 | 2/2008 | Kosinov et al. | |
| 2008/0306908 A1 | 12/2008 | Agrawal et al. | |
| 2009/0164431 A1 | 6/2009 | Zivkovic et al. | |
| 2009/0182729 A1 | 7/2009 | Lu et al. | |
| 2009/0192996 A1 | 7/2009 | Guo et al. | |
| 2010/0094854 A1* | 4/2010 | Rouhani-Kalleh | 707/706 |
| 2011/0029517 A1* | 2/2011 | Ji et al. | 707/734 |
| 2011/0072023 A1* | 3/2011 | Lu | 707/741 |
| 2011/0184981 A1* | 7/2011 | Lu et al. | 707/774 |
| 2011/0188742 A1* | 8/2011 | Yu et al. | 382/159 |

OTHER PUBLICATIONS

Guo et al. ("Named Entity Recognition in Query", published in 2009, pp. 1-8).*
Agichtein, Brill, Dumais, "Improving Web Search Ranking by Incorporating User Behavior Information", retrieved on Dec. 28, 2009 at <<http://www.mathcs.emory.edu/~eugene/papers/sigir2006ranking.pdf>>, ACM Proceedings of Conference on Research and Development in Information Retrieval (SIGIR), User behavior and modeling, 2006, pp. 19-26.
Beitzel, Jensen, Frieder, Grossman, Lewis, Chowdhury, Kolcz, "Automatic Web Query Classification Using Labeled and Unlabeled Training Data", retrieved on Dec. 28, 2009 at <<http://www.ir.iit.edu/~abdur/publications/p294-beitzel.pdf>>, ACM Proceedings of Conference on Research and Development in Information Retrieval (SIGIR), 2005, pp. 581-582.
Bergsma, Wang, "Learning Noun Phrase Query Segmentation", retrieved on Dec. 28, 2009 at <<http://www.aclweb.org/anthology/D/D07/D07-1086.pdf>>, Association for Computational Linguistics, Proceedings of Joint Conference on Empirical Methods in Natural Language Processing and Computational Natural Language Learning, Jun. 2007, pp. 819-826.

(Continued)

*Primary Examiner* — Son T Hoang
(74) *Attorney, Agent, or Firm* — Steve Wight; Judy Yee; Micky Minhas

(57) ABSTRACT

Named Entity Recognition in Query (NERQ) involves detection of a named entity in a given query and classification of the named entity into one or more predefined classes. The predefined classes may be based on a predefined taxonomy. A probabilistic approach may be taken to detecting and classifying named entities in queries, the approach using either query log data or click through data and Weakly Supervised Latent Dirichlet Allocation (WS-LDA) to construct and train a topic model.

20 Claims, 8 Drawing Sheets

(56) References Cited

OTHER PUBLICATIONS

Bikel, Miller, Schwartz, Weischedel, "Nymble: a High-Performance Learning Name-finder", retrieved on Dec. 28, 2009 at <<http://acl.ldc.upenn.edu/A/A97/A97-1029.pdf>>, Association for Computational Linguistics, Proceedings of Conference on Applied Natural Language, 1997, pp. 194-201.

Blei, Lafferty, "Dynamic Topic Models", retrieved on Dec. 28, 2009 at <<http://www.cs.princeton.edu/~blei/papers/BleiLafferty2006a.pdf>>, ACM Proceedings of Conference on Machine Learning, 2006, pp. 113-120.

Blei, Ng, Jordan, "Latent Dirichlet Allocation", retrieved on Dec. 28, 2009 at <<http://www.cs.princeton.edu/~blei/papers/BleiNgJordan2003.pdf>>, Journal of Machine Learning Research, vol. 3, 2003, pp. 993-1022.

Blei, McAuliffe, "Supervised topic models", retrieved on Dec. 28, 2009 at <<http://www.cs.princeton.edu/~blei/papers/BleiMcAuliffe2007.pdf>>, Advances in Neural Information Processing Systems 21 (NIPS), 2007, pp. 1-8.

Borthwick, "A Maximum Entropy Approach to Named Entity Recognition", retrieved on Dec. 28, 2009 at <<http://citeseer.ist.psu.edu/cache/papers/cs/33077/http:zSzzSzcs.nyu.eduzSzcswebzSzResearchzSzTheseszSzborthwick_andrew.pdf/borthwick99maximum.pdf>>, Doctoral Dissertation, Published by New York University, 1999, pp. 1-115.

Broder, "A taxonomy of web search", retrieved on Dec. 28, 2009 at <<http://cs.wellesley.edu/~cs315/Papers/Broder_TaxonomyWebSearch.pdf>>, ACM SIGIR Forum, vol. 36, Issue 2, 2002, pp. 3-10.

Cao, Jiang, Pei, He, Liao, Chen, Li, "Context-Aware Query Suggestion by Mining Click-Through and Session Data", retrieved on Dec. 28, 2009 at <<http://www.cs.sfu.ca/~jpei/publications/QuerySuggestion-KDD08.pdf>>, ACM Proceedings of Conference on Knowledge Discovery and Data Mining (SIGKDD), Industrial papers, 2008, pp. 875-883.

Collins, Singer, "Unsupervised Models for Named Entity Classification", retrieved on Dec. 28, 2009 at <<http://acl.ldc.upenn.edu/W/W99/W99-0613.pdf>>, Proceedings of Joint SIGDAT Conference on Empirical Methods in Natural Language Processing and Very Large Corpora, 1999, pp. 100-110.

Cui, Wen, Nie, Ma, "Probabilistic Query Expansion Using Query Logs", retrieved on Dec. 28, 2009 at <<http://research.microsoft.com/en-us/people/jrwen/qe-www2002.pdf>>, ACM Proceedings of Conference on World Wide Web (WWW), Search 1, 2002, pp. 325-332.

de Lima, Pedersen, "Phrase Recognition and Expansion for Short, Precision-biased Queries based on a Query Log", retrieved on Dec. 28, 2009 at <<http://delivery.acm.org/10.1145/320000/312669/p145-de_lima.pdf?key1=312669&key2=2967322621&coll=GUIDE&dl=GUIDE&CFID=70557583&CFTOKEN=49557458>>, ACM Proceedings of Conference on Research and Development in Information Retrieval, 1999, pp. 145-152.

Dietz, Bickel, Scheffer, "Unsupervised Prediction of Citation Influences", retrieved on Dec. 28, 2009 at <<http://www.mpi-inf.mpg.de/~bickel/publications/dietz_icml_2007.pdf>>, ACM Proceedings of Conference on Machine Learning (ICML), vol. 227, 2007, pp. 233-240.

Etzioni, Cafarella, Downey, Popescu, Shaked, Soderland, Weld, Yates, "Unsupervised Named-Entity Extraction from the Web: An Experimental Study", retrieved on Dec. 28, 2009 at <<http://www.cs.washington.edu/homes/etzioni/papers/knowitall-aij.pdf>>, Elsevier Science Publishers Ltd. Essex, Artificial Intelligence, vol. 165, Issue 1, Jun. 2005, pp. 91-134.

Gaizauskas, Wakao, Humphreys, Cunningham, Wilks, "University of Sheffield: Description of the LaSIE System as Used for MUC-6", retrieved on Dec. 28, 2009 at <<http://www.aclweb.org/anthology/M/M95/M95-1017.pdf>>, Association for Computational Linguistics, Morristown NJ, Proceedings of Conference on Message Understanding, 1995, pp. 207-220.

Gao, Nie, "A Study of Statistical Models for Query Translation: Finding a Good Unit of Translation", retrieved on Dec. 28, 2009 at <<http://research.microsoft.com/en-us/um/people/jfgao/paper/fp353-gao.pdf>>, ACM Conference on Research and Development in Information Retrieval, Cross language, 2006, pp. 194-201.

Gao, Nie, Zhou, "Statistical Query Translation Models for Cross-Language Information Retrieval", retrieved on Dec. 28, 2009 at <<http://delivery.acm.org/10.1145/1240000/1236184/p323-gao.pdf?key1=1236184&key2=4297322621&coll=GUIDE&dl=GUIDE&CFID=68934134&CFTOKEN=59596064>>, ACM Transactions on Asian Language Information Processing (TALIP), vol. 5, Issue 4, Dec. 2006, pp. 323-359.

Griffiths, Steyvers, Blei, Tenenbaum, "Integrating Topics and Syntax", retrieved on Dec. 28, 2009 at <<http://www.cs.princeton.edu/~blei/papers/GriffithsSteyversBleiTenenbaum2004.pdf>>, MIT Press, Advances in Neural Information Processing Systems 17, 2005, pp. 537-544.

Hofmann, "Probabilistic Latent Semantic Indexing", retrieved on Dec. 28, 2009 at <<http://www.cs.brown.edu/~th/papers/Hofmann-SIGIR99.pdf>>, ACM Proceedings of Conference on Research and Development in Information Retrieval (SIGIR), 1999, pp. 50-57.

Huang, Chien, Oyang, "Relevant Term Suggestion in Interactive Web Search Based on Contextual Information in Query Session Logs", retrieved on Dec. 28, 2009 at <<http://web.ebscohost.com/ehost/pdf?vid=2&hid=2&sid=eb38be01-28df-4cf0-b1d4-9810242a9a3c%40sessionmgr111>>, John Wiley & Sons, Inc. New York, Journal of the American Society for Information Science and Technology, vol. 54, Issue 7, May 2003, pp. 638-649.

Joachims, "Optimizing Search Engines using Clickthrough Data", retrieved on Dec. 28, 2009 at <<http://www.cs.cornell.edu/people/tj/publications/joachims_02c.pdf>>, ACM Proceedings of Conference on Knowledge Discovery and Data Mining (SIGKDD), Web search and navigation, 2002, pp. 133-142.

Jones, Rey, Madani, Greiner, "Generating Query Substitutions", retrieved on Dec. 28, 2009 at <<http://www2006.org/programme/files/pdf/3100.pdf>>, ACM Proceedings of Conference on World Wide Web (WWW), Web mining with search engines, 2006, pp. 387-396.

Lee, Liu, Cho, "Automatic Identification of User Goals in Web Search", retrieved on Dec. 28, 2009 at <<http://www2005.org/cdrom/docs/p391.pdf>>, ACM Proceedings of Conference on World Wide Web (WWW), 2005, pp. 391-400.

Liu, Dai, Li, Lee, Yu, "Building Text Classifiers Using Positive and Unlabeled Examples", retrieved on Dec. 28, 2009 at <<http://www1.i2r.a-star.edu.sg/~xlli/publication//ICDM-03.pdf>>, IEEE Proceedings of Conference on Data Mining (ICDM), 2003, pp. 1-8.

McCallum, Li, "Early Results for Named Entity Recognition with Conditional Random Fields, Feature Induction and Web-Enhanced Lexicons", retrieved on Dec. 28, 2009 at <<http://portal.acm.org/ft_gateway.cfm?id=1119206&type=pdf&coll=GUIDE&dl=GUIDE&CFID=70560843&CFTOKEN=82236648>>, Association for Computational Linguistics, Morristown NJ, Proceedings of Conference on Human Language Technology, Natural language learning (HLT-NAACL), vol. 4, 2003, pp. 188-191.

McCallum, "Multi-Label Text Classification with a Mixture Model Trained by EM", retrieved on Dec. 28, 2009 at <<http://www.cs.umass.edu/~mccallum/papers/multilabel-nips99s.ps>>, Proceedings of AAAI Workshop on Text Learning, 1999, pp. 1-7.

Mei, Cai, Zhang, Zhai, "Topic Modeling with Network Regularization", retrieved on Dec. 28, 2009 at <<http://sifaka.cs.uiuc.edu/czhai/pub/www08-net.pdf>>, ACM Proceeding of Conference on World Wide Web (WWW), Data mining: modeling, 2008, pp. 101-110.

Pasca, "Organizing and Searching the World Wide Web of Facts Step Two: Harnessing the Wisdom of the Crowds", retrieved on Dec. 28, 2009 at <<http://www2007.org/papers/paper560.pdf>>, ACM Proceedings of Conference on World Wide Web (WWW), Mining textual data, 2007, pp. 101-110.

Pasca, "Weakly-Supervised Discovery of Named Entities Using Web Search Queries", retrieved on Dec. 28, 2009 at <<http://delivery.acm.org/10.1145/1330000/1321536/p683-pasca.pdf?key1=1321536&key2=4348322621&coll=GUIDE&dl=GUIDE&CFID=70558735&CFTOKEN=31037638>>, ACM Proceedings of Conference on

(56) References Cited

OTHER PUBLICATIONS

Information and Knowledge Management, Information representation and integration (CIKM), Nov. 6, 2007, pp. 683-690.
Risvik, Mikolajewski, Boros, "Query Segmentation for Web Search", retrieved on Dec. 28, 2009 at <<http://www2003.org/cdrom/papers/poster/p052/xhtml/querysegmentation.html>>, ACM Proceedings of Conference on World Wide Web (WWW), Posters, 2003, pp. 1-4.
Rose, Levinson, "Understanding User Goals in Web Search", retrieved on Dec. 28, 2009 at <<http://delivery.acm.org/10.1145/990000/988675/p13-rose.pdf?key1=988675&key2=5778322621&coll=GUIDE&dl=GUIDE&CFID=68935477&CFTOKEN=31748285>>, ACM Proceedings of Conference on World Wide Web (WWW), Search engineering 1, 2004, pp. 13-19.
Sato, Nakagawa, "Knowledge Discovery of Multiple-topic Document using Parametric Mixture Model with Dirichlet Prior", retrieved on Dec. 28, 2009 at <<http://www.r.dl.itc.u-tokyo.ac.jp/~nakagawa/academic-res/kdd2007-2.pdf>>, ACM Proceedings of Conference on Knowledge Discovery and Data Mining (SIGKDD), Research track papers, 2007, pp. 590-598.
Sekine, Suzuki, "Acquiring Ontological Knowledge from Query Logs", retrieved on Dec. 28, 2009 at <<http://www2007.org/posters/poster900.pdf>>, ACM Proceedings of Conference on World Wide Web (WWW), Semantic web, 2007, pp. 1223-1224.
Shen, Sun, Yang, Chen, "Building Bridges for Web Query Classification", retrieved on Dec. 28, 2009 at <<http://research.microsoft.com/pubs/79490/p131-shen.pdf>>, ACM Proceedings of Conference on Research and Development in Information Retrieval (SIGIR), Fusion and spam, 2006, pp. 131-138.
Strotgen, Mandl, Schneider, "A Fast Forward Approach to Cross-lingual Question Answering for English and German", retrieved on Dec. 28, 2009 at <<http://campus.hesge.ch/schneiderr/doc/Publikationen/Fast_Forward_Approach_Eng_Ger.pdf>>, Springer Berlin, Lecture Notes in Computer Science, Accessing Multilingual Information Repositories, Part IV: Multiple Language Question Answering (CLEF), vol. 4022, 2006, pp. 332-336.
Tan, Peng, "Unsupervised Query Segmentation Using Generative Language Models and Wikipedia", retrieved on Dec. 28, 2009 at <<http://www2008.org/papers/pdf/p347-tan.pdf>>, ACM Proceeding of Conference on World Wide Web (WWW), Search: query analysis, 2008, pp. 347-356.
Ueda, Saito, "Parametric Mixture Models for Multi-Labeled Text", retrieved on Dec. 28, 2009 at <<http://books.nips.cc/papers/files/nips15/AA30.pdf>>, MIT Press, Advances in Neural Information Processing Systems 15 (NIPS), 2003, pp. 721-728.
Wei, Croft, "LDA-Based Document Models for Ad-hoc Retrieval", retrieved on Dec. 28, 2009 at <<http://ciir.cs.umass.edu/pubfiles/ir-464.pdf>>, ACM Conference on Research and Development in Information Retrieval (SIGIR), Formal models, Aug. 6, 2006, pp. 178-185.
Yu, Han, Chang, "PEBL: Positive Example Based Learning for Web Page Classification Using SVM", retrieved on Dec. 28, 2009 at <<http://www.cs.uiuc.edu/homes/hanj/pdf/kdd02svm.pdf>>, ACM Proceedings of Conference on Knowledge Discovery and Data Mining (SIGKDD), Web page classification, 2002, pp. 239-248.

\* cited by examiner

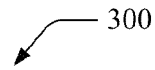

| Offline Training Algorithm |
|---|
| Input: Repository of queries $Q$, set of classes $C$, set of seed named entities $S$ with their labels $C_s, s \in S$ |
| Output: Context set $T$, class index $I_C$, and named entity index $I_E$ |
| Variable: $T_* =$ context of named entity $*$, $E =$ pool of named entities |
| 1: initialize $I_C \leftarrow \varnothing, I_E \leftarrow \varnothing$ |
| 2: $T \leftarrow \varnothing$ |
| 3: for all $q \in Q$ do |
| 4:    for all $s \in S$ do |
| 5:       if ($q$ contains $s$) then |
| 6:          $t \leftarrow RemainderContext(q, s)$ |
| 7:          $T = T \cup t$ |
| 8:          update $t$'s information in $T_s$ |
| 9:       end if |
| 10:    end for |
| 11: end for |
| 12: train topic model WS-LDA over $(S, \{T_s\}_{s \in S}, \{C_s\}_{s \in S})$ |
| 13: store learned probabilities $\{Pr(t|c)\}_{t \in T, c \in C}$ into $I_C$ |
| 14: $E \leftarrow \varnothing$ |
| 15: for all $q \in Q$ do |
| 16:    for all $t \in T$ do |
| 17:       if ($q$ contains $t$) then |
| 18:          $e \leftarrow QueryRemainderEntity(q, t)$ |
| 19:          $E = E \cup e$ |
| 20:          update $t$'s information in $T_e$ |
| 21:       end if |
| 22:    end for |
| 23: end for |
| 24: cut off $E$ to retain high quality named entities |
| 25: for all $e \in E$ do |
| 26:    estimate $Pr(e)$ with $T_e$ |
| 27:    estimate $\{Pr(c|e)\}_{c \in C}$ with $T_e$ and learned WS-LDA |
| 28:    store $(Pr(e), \{Pr(c|e)\}_{c \in C})$ in $I_E$ |
| 29: end for |
| 30: return $(T, I_C, I_E)$ |

FIG. 3

Online Prediction Algorithm

Input: Query $q = w_1 w_2 \ldots w_n$, a set of classes $C$, context set $T$, named entity index $I_E$ and class index $I_C$
Output: Top $K$ recognition results $R$ 1: initialize $R \leftarrow \varnothing$
2: for $i = 1$ to $n$ do
3:    for $j = i$ to $n$ do
4:       $e \leftarrow w_i w_{i+1} \ldots w_j$
5:       $t \leftarrow w_1 w_2 \ldots w_{i-1} \# w_{j+1} w_{j+2} \ldots w_n$
6:       if ($e \in I_E$ and $t \in T$) then
7:          for all $c \in C$ do
8:             $r \leftarrow$ new recognition
9:             $r.triple \leftarrow \{e, t, c\}$
10:            compute $\Pr(e), \Pr(c|e), \Pr(t|c)$ using $I_E$ and $I_C$
11:            $r.prob \leftarrow \Pr(e) \Pr(c|e) \Pr(t|c)$
12:            $R.push(r)$
13:          end for
14:       end if
15:    end for
16: end for
17: sort $R$ by $prob$
18: truncate $R$ to size $K$
19: return $R$

FIG. 5

NAMED ENTITY RECOGNITION IN QUERY

BACKGROUND

Query processing can be important for search-enabled applications, including web search applications. Some solutions to processing queries for information have focused on methods of query segmentation, syntactic parsing, query classification, and query log mining.

Query segmentation generally relates to separating a query into a number of smaller units. Often there may be limitations on the types of segmented units possible, resulting in limited functionality in the method. Syntactic parsing generally focuses on identifying the linguistic structure of a query. Query classification generally falls into two groups: classification according to search intent, such as informational, navigational or transactional; and classification according to the semantics of a query, such as "shopping" or "living." With either type of query classification, the whole query is generally classified and there is usually no further analysis on the internal structure of the query.

Query log mining has generally involved acquiring the named entities in a specific class from a query log. A named entity in this context may be a name within the query log that indicates a particular entity such as a real or imaginary person, group, organization, company, item, or the like. Query log mining has often been done by utilizing templates of the specific class. This approach is generally deterministic and usually only works in cases where a named entity belongs to only a single class.

Additionally, a method of Named Entity Recognition (NER) has been performed on text documents (generally natural language texts), using a defined set of rules based on sentence formation. The rules may include whether some identifiable features may be present in the documents. Such features may include whether or not the term "Mr." occurs before a word, or whether or not the first letter of a word is capitalized. These types of features may indicate the presence of a named entity in the document. However, directly applying these traditional approaches to Named Entity Recognition in Query (NERQ) may not be effective, because search queries are usually short in word length (e.g., 2 to 3 words long) and not well formed (e.g., not formed in complete sentences and not properly capitalized—perhaps having all words in lower case). Thus, the identifiable features may not be present in most search queries.

SUMMARY

This summary introduces simplified concepts of named entity recognition in a query, which are further described below in the Detailed Description.

This application describes recognition of named entities in search queries, and prediction of one or more classifications for each of the named entities recognized. In one aspect, a method includes receiving an input query from a user and detecting a named entity in the input query. The method continues with predicting at least one classification for the detected named entity based on a topic model and a predefined taxonomy, and then outputting the detected named entity and the classification(s) to the user.

In another aspect, a method includes defining a seed set of seed named entities and assigning at least one classification to each of the seed named entities based on a predefined taxonomy. A topic model is then trained, based on the seed named entities and their classifications. The method continues with receiving an input query from a user and detecting a named entity in the input query. At least one classification is predicted for the detected named entity, based on the topic model and the predefined taxonomy, and then the detected named entity and its classification(s) are outputted to the user.

In one example of the aspect, a method includes generating training data configured to train the topic model. The example method comprises scanning a data source for search queries having the seed named entities and collecting the search queries that have the seed named entities. The contexts of the search queries that have the seed named entities are identified. The data source may then be scanned again for search queries having the identified contexts, and the search queries that have the contexts are collected. New named entities are then extracted from the search queries that have the contexts.

In yet another aspect, a system is described as having a memory and a processor coupled to the memory, where the processor executes an offline training component and an online prediction component. In one example embodiment, the offline training component is configured to define a seed set, including a seed named entity, from a data set comprising multiple search queries. At least one classification assignment for the seed named entity is received based on a predefined taxonomy. The offline training component is further configured to scan a data source for search queries having the seed named entity and collect the search queries that have the seed named entity. The contexts of the search queries that have the seed named entity are then identified. The data source is scanned again for search queries having the contexts, and the search queries that have the contexts are collected. New named entities are extracted from the search queries that have the contexts, and a topic model is trained based on the new named entities and their classifications using a Weakly Supervised Latent Dirichlet Allocation (WS-LDA) learning method.

In an example embodiment, the online prediction component is configured to receive an input query from a user and detect another named entity in the input query. The online prediction component is further configured to automatically predict at least one other classification for the detected other named entity based on the topic model and the predefined taxonomy, and then output the detected other named entity and its predicted classification(s) to the user.

This summary is provided to introduce a selection of concepts in a simplified form to be further described below in the Detailed Description. This summary is not intended to identify key features or essential features of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3 illustrates an example of an offline training algorithm according to an embodiment of the present disclosure.

FIG. 5 illustrates an example of an online prediction algorithm according to an embodiment of the present disclosure.

DETAILED DESCRIPTION

Overview

Figure 1:
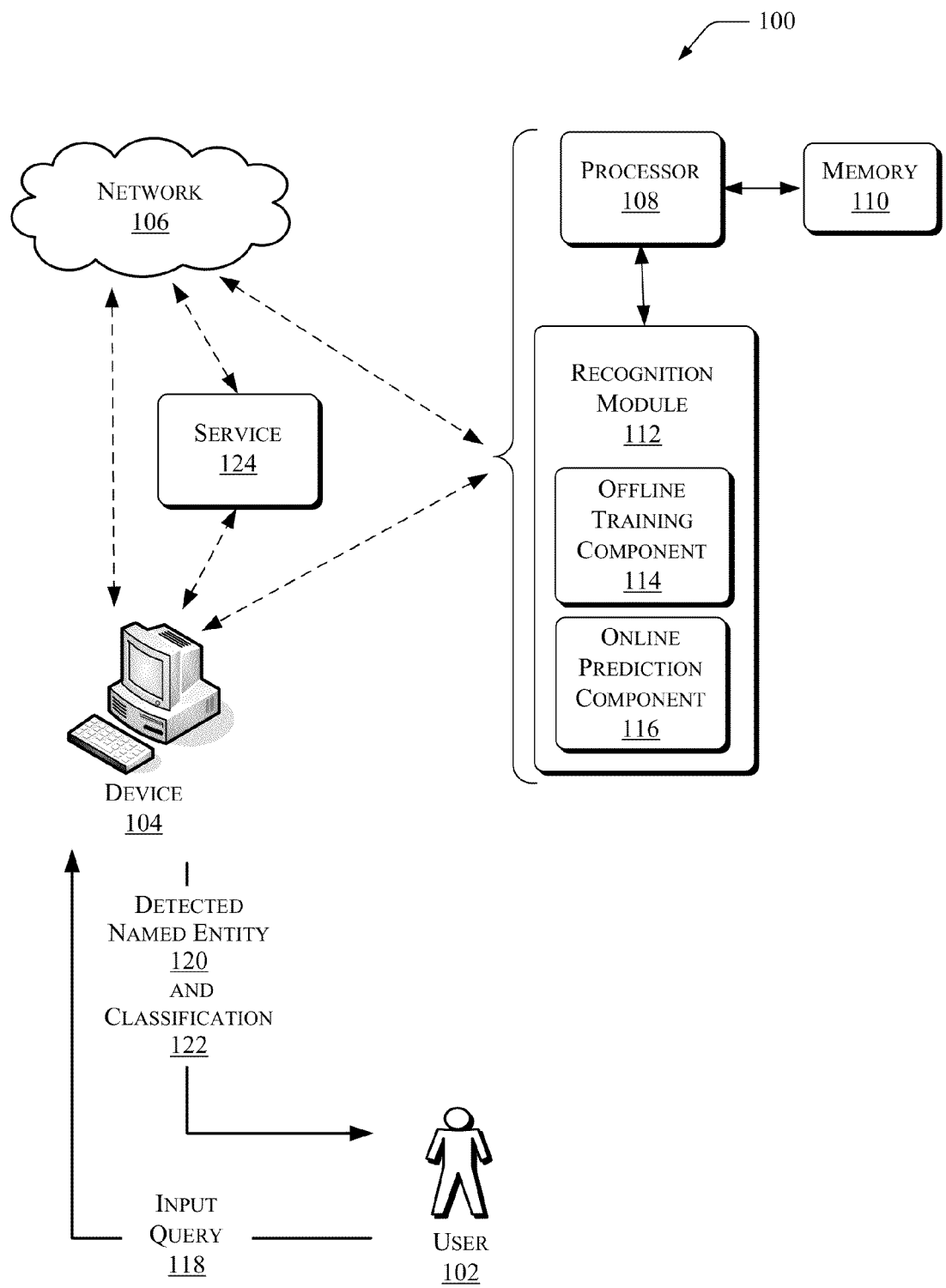
FIG. 1 illustrates an example environment suitable for named entity recognition in a query.

This disclosure describes systems, techniques, and methods of recognizing named entities in a query and classifying the named entities with one or more classes (labels) as appropriate. Given a query, such as a search query, the systems and/or methods described herein may be employed to detect a named entity within the query and identify or predict a most likely (probable) class or classes of the named entity. A query as used in this disclosure will often be described in terms of an input query to a web-based search engine. However, this is for simplicity of explanation, and does not limit the term query to that use. As used in this disclosure, the term query applies to any type of query, including those used in various applications for various types of inquiry or searching functions, including, for example, queries used in database applications, cataloging applications, or encyclopedia-type applications.

A named entity within a query may be a name within the query that indicates a particular entity such as a real or imaginary person, group, organization, company, item, and the like. A named entity may be a proper name, or a common name. For example, named entities may include "Harry Potter," "Star Trek," "Halo," or "Pink Floyd." Classes of named entities may be labels, topics, or categories for the named entities based on the context of the named entity as used in the query. Classes of named entities can be, for example, "Book," "Movie," "Game", or "Music." A named entity may have more than one class or label that applies. Further, depending on the query, one or more classes may be more likely (probable) classes, and others may be less likely classes or unlikely classes.

For instance, given an example search query "harry potter walkthrough," one may detect "harry potter" as a named entity within the query, and may assign "Game" to it as the most likely class, "Movie" and "Book" as less likely classes, and "Music" as an unlikely class. This is because the context "walkthrough" strongly indicates that "harry potter" as used here is more likely to mean the Harry Potter game. If the search query was only "harry potter," then "Book" and "Movie" may be more plausible. Note that for the purposes of this disclosure, the term "context" may be further defined as the remainder of a query other than the named entity. Thus, a context may be blank, null, or empty if a query only contains a named entity, and no other terms.

Identifying named entities in queries can help to understand search intents better. For example, by identifying a named entity, it may possible to provide better search results and improve ranking in a relevance search. Additionally, more relevant query suggestions may be generated by treating named entities and contexts separately. For example, using the input query "harry potter walkthrough," the query suggestion "harry potter cheats" may be a relevant suggestion since it has a context in the same class (here, walkthrough and cheats both relate to games). Additionally, "halo 3 walkthrough" may also be a relevant suggestion since it has a named entity in the same class (here, both named entities are games).

A new probabilistic approach to Named Entity Recognition in Query (NERQ) using query log data or click-through data is herein described. Without loss of generality, a query having one named entity may be represented as a triple (e,t,c), where e denotes a named entity, t is the context of the named entity, and c is the class of the named entity. Again, note that t can be empty (i.e., no context) in queries having only a named entity, an input query, "harry potter."

A general goal of one example approach to NERQ may be finding the triple (e,t,c) for a given query q, which has the largest joint probability $P_r(e,t,c)$. That is, what context and class of a named entity did the user most likely intend in the query. The identified joint probability may be factorized and then estimated using query log data and Latent Dirichlet Allocation (LDA). In a LDA model, contexts of a named entity may be represented as words of a document and classes of the named entity may be represented as topics of the model. To ensure a reliable alignment between model topics and predefined classes, a weakly supervised learning method, referred to as WS-LDA (Weakly Supervised Latent Dirichlet Allocation), may be employed which can leverage the weak supervision (from humans) as part of the process. A weakly supervised learning method is one in which humans participate, at least in part, in the decision-making processes used to train the model. For example, humans can receive named entities instead of full queries, and then decide whether a named entity is classified as a "Movie" or a "Game," based on their own knowledge. They may make this decision without knowing the context of the named entity in a query.

Multiple and varied implementations and embodiments are described below. In the following section, an example environment that is suitable for practicing various implementations is described. After this discussion, representative implementations of systems, devices, and processes for named entity recognition in a query are described.

Exemplary Architecture

FIG. 1 illustrates an example environment 100 suitable for Named Entity Recognition in Query (NERQ). For discussion purposes, the environment 100 may be configured to receive an input query from a human user 102. In other implementations, a computer or other device may automatically perform some or all of the functions performed by the user 102.

Typically, the user 102 may interact with a device 104. Interaction with the device 104 may include, for example, inputting data via an input and/or receiving output data via an output of the device 104. The device 104 may be coupled to a network 106.

A typical device 104 may be implemented as a variety of conventional computing devices including, for example, a server, a desktop PC, a notebook or portable computer, a workstation, a mainframe computer, a mobile computing device, an Internet appliance, a network router, etc., or a combination thereof that is configurable to receive input queries and output query results, as well as to perform named entity recognition in query and classification of the named entity recognized.

The network 106 may be a wireless or a wired network, or a combination thereof. The network 106 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 104 includes a processor 108 coupled to a memory 110. The memory 110 may include computer-readable storage media in the form of volatile memory, such as Random Access Memory (RAM) and/or non-volatile memory, such as read only memory (ROM) or flash RAM. The memory 110 typically includes data and/or program modules for implementing NERQ on input queries that are immediately accessible to and/or presently operated on by the processor 108. In one embodiment, the memory 110 may include other software that assists in the functioning of the device 104, such as an operating system. The memory 110 may also include application data specific to an operating system or an application running on the device 104. The memory 110 may also be coupled to, associated with, and/or accessible to other devices, such as network servers, routers, and/or other devices 104.

In an example embodiment, the processor 108 is also coupled to a recognition module 112. The recognition module 112 includes an offline training component 114 and an online prediction component 116. The use of these two components within the recognition module 112 with regard to NERQ will be explained in detail below.

The recognition module 112 may be configured to receive an input query 118 from the user 102, and output a detected named entity 120 and at least one classification 122 for the named entity 120 to the user 102.

In one embodiment, the device 104 may comprise the processor 108, the memory 110, the recognition module 112, the offline training component 114, and the online prediction component 116 as illustrated in FIG. 1. However, in other embodiments, one or more of the components described may be located remotely to the device 104, may be distributed at various points on the network 106, or the like.

Further, the device 104 may be running a service 124. The service 124 may be a local application such as a cataloging application, an encyclopedia application, or the like, that primarily resides and runs on the device 104. In an alternate embodiment, the local application may have an optional connection to the network 106 that may be engaged. The service 124 may alternatively be a remote or web-based application such as a web-based search engine, a network tool, or the like, that primarily resides and runs on the network 106. In an alternate embodiment, the service 124 may comprise both local and remote components. The user 102 may interact with the service 124 through the device 104.

Offline Training Component

Figure 2:
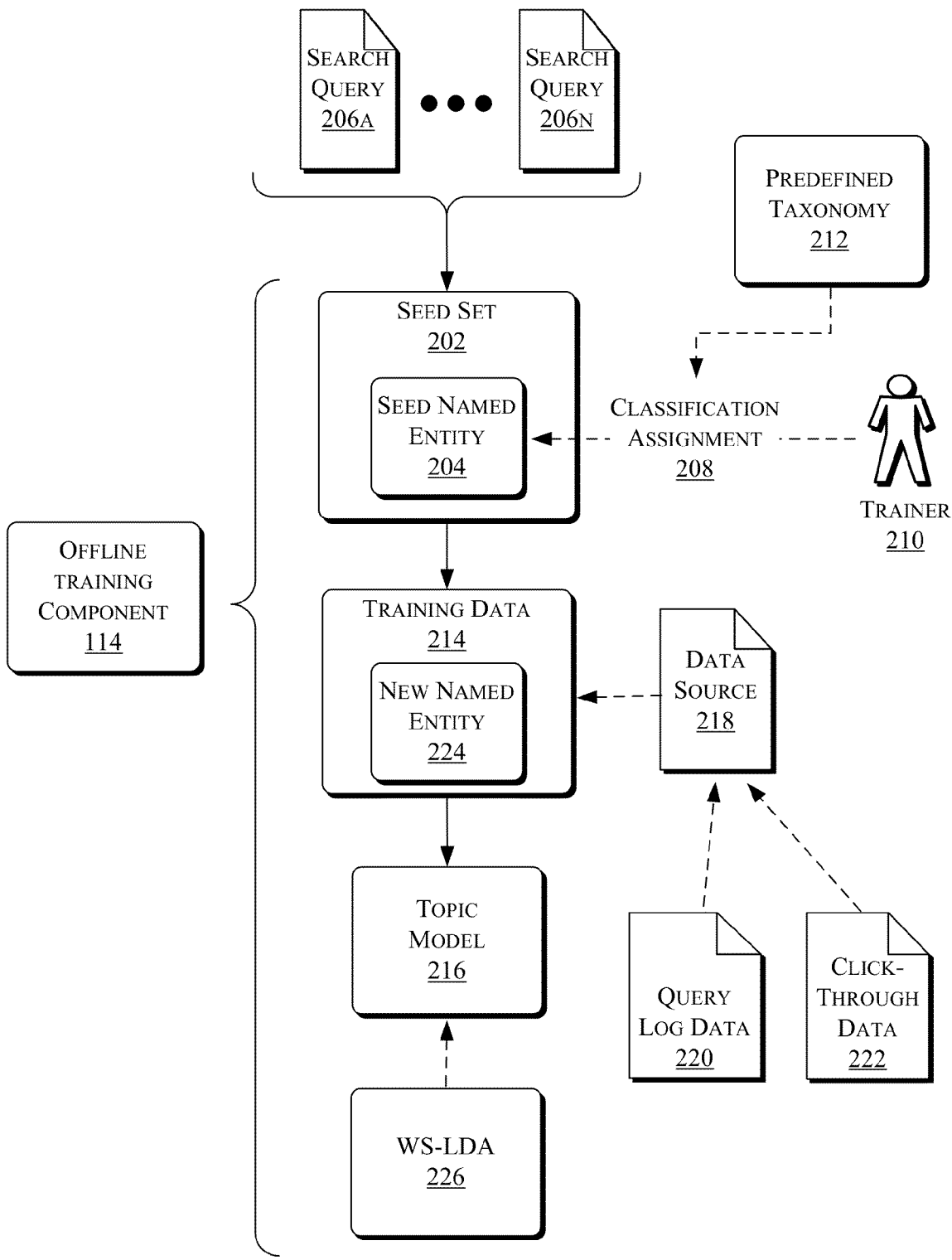
FIG. 2 illustrates details of an example offline training component according to an embodiment of the present disclosure.

FIG. 2 illustrates details of an example offline training component 114. In an example embodiment, a seed set 202 may be constructed from a number of seed named entities 204. The seed named entities 204 forming the seed set 202 may be extracted from search query data, which may be comprised of individual search queries 206A through 206N. Any number of search queries 206A through 206N may be used to extract seed named entities 204. The number of search queries 206A through 206N gives a reasonable representation of the seed named entities 204 contained therein. In one embodiment, millions or billions of search queries 206A through 206N are used to extract the seed named entities 204. The number of seed named entities 204 will typically be somewhat less than the number of search queries 206A through 206N that they are extracted from, since certain named entities may recur frequently in searches, especially the more popular named entities. The search queries 206A through 206N may be sampled from a query log (not shown), such as a query log from a commercial web search engine, for example from GameSpot.com®, IMDb.com, Lyrics.com, or the like. In other embodiments, the search queries 206A through 206N may be obtained from other sources.

Each of the seed named entities 204 in the seed set 202 receives one or more classifications (also described as classes or labels) 122 through a classification assignment 208. There may be multiple classes 122 assigned to each seed named entity 204, based on the likelihood of the class 122, and considering the context of the seed named entity 204 in the queries it is extracted from. In an example embodiment, the classification assignment 208 (or labeling) of the seed named entities 204 is made by one or more human trainers 210. This process of making classification assignments 208 by humans may be referred to as a "weak supervision" technique, and is discussed further below. In alternate embodiments, the classification assignment 208 (or labeling) of the seed named entities 204 may be made with the assistance of automation. The seed named entities 204 are assigned labels or classifications 122 based on a predefined taxonomy 212. This predefined taxonomy 212 may limit the number of possible labels 122 that can be assigned to a seed named entity 204, and may create separate divisions of classes 122. The predefined taxonomy 212 used here may be a system and/or method for classification of named entities, for example, where possible classes are determined in advance, and each named entity may be associated with at least one of the possible classes. The predefined taxonomy 212 refers to a classification/organization of named entities, where possible classes are determined in advance representing the generalization concept of named entities, and each named entity may be associated with at least one of the possible classes. In one embodiment, four classes are possible, including "Movie," "Game," "Book," and "Music." In alternate embodiments, more or less classes may be possible, while remaining within the scope of this disclosure.

The seed named entities 204 in the seed set 202 may be used to construct training data 214 to train a topic model 216. In one embodiment, a data source 218 may be scanned for queries containing the seed named entities 204. In one embodiment, the data source 218 may be query log data 220, such as the query logs described above, from commercial web search engines, or the like. In another embodiment, the data source may be click through data 222.

Click through data 222 comprises queries and the associated Uniform Resource Locator (URL) associated with results of the queries, where the URLs have been "clicked on" or otherwise selected by the users who input the queries. Click through data may provide an additional level of confidence in a result of a query. This is because a user who input a search query subsequently selected the result (a URL) after it was presented to the user following a search. It may be assumed that if several results are presented to a user following an input query, a URL clicked on by the user is more likely what the user was searching for when he or she input the query. This assumption may be considered to be leveraging the wisdom of the crowds, and may strengthen the training data 214 used to train the topic model 216.

All queries in the data source 218 that contain the seed named entities 204 may be identified and collected. The contexts of the seed named entities 204 may then be identified and collected from those queries. The context of a seed named entity 204 may be defined as the remainder of a query, once the seed named entity 204 has been subtracted from the query.

The data source 218 may be scanned again, this time scanning the search queries in the data source 218 for the contexts just identified. The search queries having the identified contexts may then be collected. New named entities 224 may then be extracted from those search queries containing the contexts. To ensure high quality extraction of new named entities 224, a heuristic threshold cut-off may be made in this process. For example, if the new named entity 224 appears with less than N unique contexts collected above, the new named entity would be cut off, or excluded from the collection. These new named entities 224 already have their contexts identified due to the method of their extraction. Thus, these new named entities 224 may be used to train the topic model 216. The topic model 216 may be used to resolve ambiguities of named entity classes, as discussed below. As one skilled in the art will recognize, a topic model includes a probabilistic generative model based upon the idea that documents are mixtures of topics, where a topic is a probabilistic distribution over words. The words in a document are independently sampled from document topics according to their word distributions.

A learning method referred to as Weakly Supervised Latent Dirichlet Allocation (WS-LDA) 226 may be employed to train the topic model 216 using the training data 214 acquired as described above. Specifically, WS-LDA 226 may be used to estimate the probability of having a classification c, given a particular named entity e (written: Pr(c|e)) for the newly extracted named entities 224, with the probability of having a context t, given a particular classification c (Pr(t|c)) being fixed. For example, estimating the probability of having a classification "Game," given the named entity "harry potter," while the probability of having a context "walkthrough," given the classification "Game" is fixed at 1. The probabilities of having a particular named entity e (Pr(e)) for newly extracted named entities 224 may also be estimated in this process. Specifically, the total frequency of queries containing e in the data source 218 may be used to approximate Pr(e). In general, the more frequently a named entity e occurs, the larger the probability Pr(e) will be. The details of WS-LDA 226 will be discussed in a later section.

All of the probabilities needed to train the topic model 216, that is, Pr(e), Pr(c|e), and Pr(t|c) may be estimated as described above and discussed in detail below. In one embodiment, the estimated probabilities may be stored for efficient online prediction. For example, the estimated probabilities may be stored in an index, a database, or the like, and may be stored local to the device 104 or may be stored on the network 106 or another remote location. An example detailed algorithm 300 for the offline training process as described above is shown in FIG. 3.

Online Prediction Component

Figure 4:
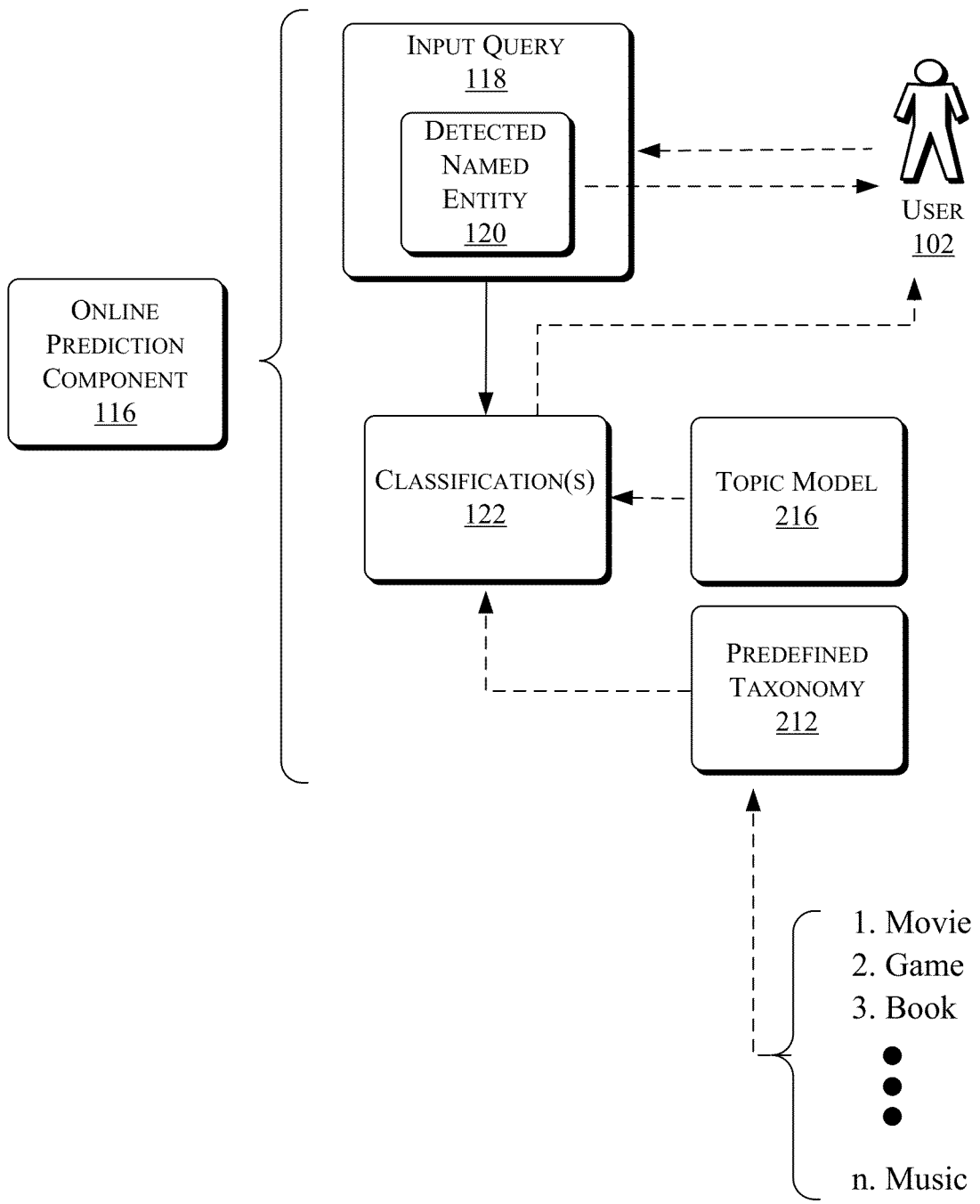
FIG. 4 illustrates details of an example online prediction component according to an embodiment of the present disclosure.

FIG. 4 illustrates details of an example online prediction component 116. In general, the online prediction component 116 may be configured to receive an input query 118 from a user 102, and to detect a named entity 120 in the input query 118. Note that while the detected named entity 120 is distinguished from the seed named entity 204 or the new named entity 224 discussed in the section above, it is possible for each of these named entities to have the same value. For example, it is possible for the detected named entity 120, the seed named entity 204, and the new named entity 224 to all have the value "harry potter."

The online prediction component 116 may be further configured to automatically predict one or more classifications 122 for the detected named entity 120 based on the trained topic model 216 and guided by the predefined taxonomy 212. As discussed above, the predefined taxonomy 212 may define any number of possible classifications (labels) 122. In one embodiment, the predefined taxonomy 212 may define the classifications 122 as "Movie," "Game," "Book," and "Music." In alternate embodiments, the predefined taxonomy 212 may define additional classifications 122, or may define fewer or other different classifications 122.

The online prediction component 116 may also be configured to output the named entity 120 that was detected in the input query 118 and the predicted classification(s) 122 for the detected named entity 120 to the user 102.

In an example embodiment, the online prediction component 116 is configured to perform the detection and prediction functions using a probabilistic approach. This probabilistic approach, which is detailed below, may be generalized as a process of finding the most likely triples in a function G(q) for a query q. The function G(q) may be generated by segmenting an input query 118 into a named entity 120 and its context in all possible ways, and labeling the segmented named entities 120 with all possible classes 122. For each triple (e, t, c) in G(q), the joint probability Pr(e, t, c) is then calculated. In an example embodiment, the triples with highest probabilities are the output results for NERQ. An example detailed algorithm 500 for the online prediction process using a probabilistic approach as described above is shown in FIG. 5. Note that the time complexity of the algorithm 500 is $O(kn^2)$, where k denotes a number of classes and n denotes a number of words in a query. Since both k and n may be very small, the prediction can generally be conducted very efficiently. In one example embodiment, those queries which do not have a named entity and a context stored in the index may be skipped for efficiency.

While various discreet embodiments are described, the individual features of the various embodiments may be combined or modified to form other embodiments not specifically described.

Basic Methodology

An example methodology for recognizing a named entity in a query is described below.

A Probabilistic Approach

A single-named-entity query q can be represented as a triple (e, t, c), where e denotes a named entity, t denotes the context of e in q, and c denotes the class of e. For example, for an input query "harry potter walkthrough" belonging to the context Game, the associated triple is ("harry potter", "#walkthrough", Game). Note that t may be further expressed as α#β, where α and β denote the left and right contexts respectively and # denotes a placeholder for a named entity. Either α or β can be empty (e.g. "# walk-through", "lyrics to #"), or both can be empty (i.e. "#").

In one embodiment, a goal of NERQ is to detect the named entity e in query q, and assign the most likely class label c to e. Therefore, this goal can be accomplished by finding the triple (e,t,c)* among all possible triples, satisfying:

$$(e, t, c)^* = \text{argmax}_{(e,t,c)} Pr(q, e, t, c) \quad (1)$$
$$= \text{argmax}_{(e,t,c)} Pr(q \mid e, t, c) Pr(e, t, c)$$
$$= \text{argmax}_{(e,t,c) \in G(q)} Pr(e, t, c)$$

In Eqn. (1), conditional probability Pr(q|e, t, c) represents how likely query q is generated from triple (e, t, c). Note that given a triple, it will uniquely determine a query. Therefore, for a fixed query q and triple (e, t, c), Pr(q|e, t, c) can only be one or zero. That is, there are only two possibilities: either (e, t, c) generates q or (e, t, c) does not generate q. For instance, the query "harry potter walkthrough" can be generated by ("harry potter", "# walkthrough", *), but not ("halo 3", "# walkthrough", *). We define G(q) as the set containing all possible triples that can generate query q (i.e., Pr(q|e, t, c) equals one). Thus, the triple having largest probability (e, t, c)* must be in G(q).

According to this embodiment, conducting NERQ involves calculating the joint probability Pr(e, t, c) for each triple in G(q), which can be further factorized as below:

$$Pr(e, t, c) = Pr(e)Pr(c \mid e)Pr(t \mid e, c) \quad (2)$$
$$= Pr(e)Pr(c \mid e)Pr(t \mid c)$$

In Eqn. (2), $Pr(t_i|c)$ may be set equal to $Pr(t_i|c, e_i)$. That is to say, context depends on class but not on a specific named entity. This assumption largely reduces the parameter space and thus makes the learning tractable. It is also a reasonable assumption in practice because classes usually share common contexts. For example, "Music" takes "# lyrics" and "# mp3" as contexts. There may be contexts specific to named entities. However, due to data sparseness, may be difficult to accurately estimate the probabilities of them.

The problem then becomes how to estimate Pr(e), Pr(c|e) and Pr(t|c). The number of such probabilities may be extremely large, because there may be an extremely large number of named entities and contexts. These include variants of named entities like "harry potter 6" and "harry potter and the half-blood prince," and variants of contexts like "# lyrics," "lyrics to #," and even typos "# lyrix."

A Topic Model for NERQ

In one embodiment, it is assumed that there is a training data set available (training data 214 as described above), which contains triples from labeled queries T={($e_i,t_i,c_i$)|i=1, ..., N}, where ($e_i,t_i,c_i$) denotes the "true" triple for query $q_i$ and N is the data size. Therefore, the learning problem can be formalized as:

$$\max \prod_{i=1}^{N} Pr(e_i, t_i, c_i) \quad (3)$$

If each named entity only belongs to one class, the training data T may be easily built (for example, using a maximum likelihood estimation described by M. Pasca, *CIKM '07*, pages 683-690, 2007). However, in reality, named entities may be more ambiguous, e.g., "harry potter" can belong to classes "Book", "Movie", and "Game." Therefore, in one embodiment, training data T={($e_i, t_i$)} may be collected, and class label $c_i$ may be viewed as a hidden variable. Also, the possible classes of each named entity in training may be known. The learning problem with respect to the new training data T={($e_i,t_i$)} becomes:

$$\max \prod_{i=1}^{N} Pr(e_i, t_i) = \max \prod_{i=1}^{N} Pr(e_i) \sum_c Pr(c \mid e) Pr(t_i \mid c) \quad (4)$$

In Eqn. (4), $Pr(e_i)$ represents the popularity of named entity $e_i$, $Pr(c|e_i)$ represents the likelihood of class c given named entity $e_i$, and $Pr(t_i|c)$ represents the likelihood of context $t_i$ given class c. The prior probability $Pr(e_i)$ can be estimated in different ways, independent of $Pr(c|e_i)$ and $Pr(t_i|c)$. Suppose it is estimated as $\hat{Pr}(e_i)$, then Eqn. (4) becomes:

$$\max \prod_{i=1}^{N} \hat{Pr}(e_i) \prod_{i=1}^{N} \sum_c Pr(c \mid e_i) Pr(t_i \mid c) \quad (5)$$

Here, the learning problem becomes that of learning the probabilities in Eqn. (5), which form a topic model.

WS-LDA

Since the topics in a model may be predefined, and the possible topics of a document may be given, a new method for learning a topic model, referred to as Weakly Supervised Latent Dirichlet Allocation (WS-LDA) (226 as described above) may be employed. For purposes of discussion here, conventional notations for document processing are used to describe the topic model. Specifically, contexts become "words," contexts of a named entity form a "document", and classes of named entity correspond to "topics." By way of example, suppose that generated training data contains named entity "harry potter" with classes "Movie," "Book," and "Game," and three queries containing "harry potter" are found in a query log, "harry potter movie," "harry potter walkthrough," and "harry potter review." Then a document (context) with respect to "harry potter" may contain three words, i.e., "# movie," "# walkthrough," and "# review," and the topics of the document may be "Movie," "Book," and "Game."

Accordingly, the topic model in Eqn. (5) can be rewritten in the following form for better understanding:

$$\prod_e \prod_{\{i|e=e_i\}} \sum_c Pr(c \mid e_i) Pr(t_i \mid c) \quad (6)$$

In this example, e denotes a unique named entity in the training data. Note that $\hat{Pr}(e_i)$ is dropped for clarity, and it can be easily integrated into the model. The first product in Eqn. (6) is computed for all the unique named entities in the training data (document level product), and the second product is calculated for all the contexts of the same named entity (word level product).

Model

The definition of the model may first be given in WS-LDA, which may be the same as with conventional LDA. Suppose, for example, there is a corpus of M documents D={wi, ..., $w_M$} sharing K topics, and each document is a sequence of N words denoted by w={$w_1$, ..., wn}. The documents w in the corpus D may be generated by the following generative process, where θ represents the topic distribution of a document. (Since Dirichlet(α) is the distribution of distributions, Dirichlet(α) can be sampled from to get a distribution):

1. Draw topic distribution θ~Dirichlet(α)
2. For each word
   a. Draw topic assignment $z_n$~Multinomial(θ)
   b. Draw word $w_n$~Multinomial($\beta_{z_n}$), a multinomial distribution conditioned on topic $z_n$.

Given parameters Θ={α, β}, the probability distribution of a document may be obtained by:

$$p(w \mid \Theta) = \int p(\theta \mid \alpha) \left( \prod_{n=1}^{N} \sum_{z_n} p(z_n \mid \theta) p(w_n \mid z_n, \beta) \right) d\theta \quad (7)$$

Finally, taking the product of probabilities of documents, the probability of corpus may be obtained by:

$$p(D \mid \Theta) = \prod_{d=1}^{M} \int p(\theta_d \mid \alpha) \left( \prod_{n=1}^{Nd} \sum_{z_{dn}} p(z_{dn} \mid \theta_d) p(w_{dn} \mid z_{dn}, \beta) \right) d\theta_d \quad (7A)$$

Weak Supervision

In NERQ, employing an unsupervised learning method to learn the topic model generally will not work, because the topics (classes) may be explicitly predefined in NERQ. In contrast, the topics in a conventional topic model may be implicit and may be automatically learned. There may be no guarantee that the hidden topics learned by an unsupervised learning method will be aligned with the predefined topics (classes). Therefore, in one embodiment, supervision may be introduced in the training process of the topic model 216.

In an example embodiment, the supervision is the manual class labeling of each seed named entity 204. The labels assigned may not be exclusive because ambiguity exists in named entities. For example, "harry potter" may have three classes, i.e., "Movie," "Book," and "Game." In the embodiment, human judges are tasked to make a judgment only on whether a named entity can belong to a class or not. (It would be extremely hard for human judges to decide a probability of a named entity's belonging to a class.) This type of labeling may be referred to as weak supervision for training. In the terminology of topic modeling, that means a document may have high probabilities on labeled topics, but very low probabilities on unlabeled topics.

Objective Function

In one example, given a document w, the assigned class labels may be represented as $y=\{y_1, \ldots, y_K\}$, where $y_i$ takes 1 or 0 when the i-th topic is or is not assigned to the document, and K denotes the number of topics. The weak supervision information may be used as soft constraints in the objective function. WS-LDA tries to maximize the likelihood of data with respect to the model, and at the same time satisfy the soft constraints. The constraints are defined as follows:

$$C(y, \Theta) = \sum_{i=1}^{K} \hat{y}_i z_i \quad (8)$$

$$\text{given: } \hat{z}_i = 1/n \sum_{n=1}^{N} z_n^i$$

where is $z_n^i$ is 1 or 0 when the i-th topic is or is not assigned to the n-th word. That is to say, $\hat{z}_i$ represents an empirical probability of the i-th topic in document w. Thus, in an embodiment, maximizing the soft constraints may meet the following two goals at the same time: (1) the i-th latent topic is aligned to the i-th predefined class; and (2) the document w is mainly distributed over labeled classes.

Specifically, the objective function with respect to a document may be defined as follows:

$$O(w|y,\Theta) = \log p(w|\Theta) + \lambda C(y,\Theta) \quad (9)$$

where likelihood function $p(w|\Theta)$ and soft constraint function $C(y, \Theta)$ are represented as in Eqn. (7) and (8) respectively, and $\lambda$ is a coefficient representing the weight or importance attributed to the weak supervision in the training. If $\lambda$ equals 0, WS-LDA learning degenerates to LDA learning.

Finally, substituting Eqn. (7) and (8) into Eqn. (9) and taking the sum over all documents, the following total objective function may be obtained:

$$O(D \mid Y, \Theta) = \sum_{d=1}^{M} O(w_d \mid y_d, \Theta) \quad (10)$$

$$= \sum_{d=1}^{M} \log \int p(\theta_d \mid \alpha)$$

$$\left( \prod_{n=1}^{Nd} \sum_{z_{dn}} p(z_{dn} \mid \theta_d) p(w_{dn} \mid z_{dn}, \beta) \right) d\theta_d +$$

$$\sum \lambda \sum \hat{y}_{di} z_{di}$$

Algorithm

Thus, WS-LDA can be equivalent to maximizing the objective function in Eqn. (10). However, there may be no analytic solution for the problem as in conventional LDA learning. Therefore, a variational method may be employed wherein the approximate distribution is characterized by the following variational distribution:

$$q(\theta, z \mid \Lambda) = q(\theta \mid \gamma) \prod_{n=1}^{N} q(z_n \mid \varphi_n)$$

where $\Lambda = \{\gamma, \phi_{1:N}\}$ are variational parameters. Specifically, $\gamma$ is a Dirichlet parameter of the model and $\phi_{1:N}$ are internal multi-nominal parameters of the model.

Therefore, the objective function for a single document can be derived as follows.

$$O(w \mid y, \Theta) = L(\Lambda; \Theta) + D(q(\theta, z \mid \Lambda) \| p(\theta, z \mid w, \Theta)) \quad (11)$$

where, $$L(\Lambda; \Theta) = \int \sum_z q(\theta, z \mid \Lambda) \log \frac{p(\theta, z, w \mid \Theta)}{q(\theta, z \mid \Lambda)} d\theta +$$

$$\int \sum_z q(\theta, z \mid \Lambda) \lambda C(y, \Theta) d\theta$$

Minimizing a divergence of K*L between the variational posterior probability and the true posterior probability, denoted as $D(q(\theta, z|\Lambda) \| p(\theta, z|w, \Theta))$, gives a good approximate distribution of $p(\theta, z|w, \Theta)$, where L is the lower bound of the objective function. From Eqn. (11) it may be shown that this is equivalent to maximizing the lower bound $L(\Lambda; \Theta)$ on the objective function $O(w|y, \Theta)$ with respect to $\Lambda$ which has the form:

$$O(w \mid y, \Theta) \geq L(\Lambda, \Theta) = E_q[\log p(\theta \mid \alpha)] + E_q[\log p(z \mid \theta)] +$$

$$E_q[\log p(w \mid z, \beta)] - E_q[\log q(\theta)] - E_q[\log q(z)] + E_q[\lambda C(y, \Theta)]$$

Let $\beta_{iv}$ be $p(w_n^v = 1 | z^i = 1)$ for word v. Each of the above terms can be expressed in the following equations (12)-(17):

$$L(\Lambda; \Theta) = \log \Gamma \left( \sum_{j=1}^{K} \alpha_j \right) - \sum_{j=1}^{K} \log \Gamma(\alpha_i) + \sum_{i=1}^{K} (\alpha_i - 1) \left( \Psi(\gamma_i) - \Psi\left( \sum_{j=1}^{K} \right) \right) \quad (12)$$

-continued $$+ \sum_{n=1}^{N} \sum_{i=1}^{K} \phi_{ni} \left( \Psi(\gamma_i) - \Psi\left( \sum_{j=1}^{K} \gamma_j \right) \right) \quad (13)$$

$$+ \sum_{n=1}^{N} \sum_{i=1}^{K} \sum_{v=1}^{V} \phi_{ni} w_n^v \log\beta_{iv} - \log\Gamma\left( \sum_{j=1}^{K} \gamma_j \right) + \sum_{i=1}^{K} \log\Gamma(\gamma_i) \quad (14)$$

$$- \sum_{i=1}^{K} (\gamma_i - 1) \left( \Psi(\gamma_i) - \Psi\left( \sum_{j=1}^{K} \gamma_j \right) \right) \quad (15)$$

$$- \sum_{n=1}^{N} \sum_{i=1}^{K} \phi_{ni} \log \phi_{ni} \quad (16)$$

$$+ \frac{\lambda}{N} \sum_{n=1}^{N} \sum_{i=1}^{K} y_i \phi_{ni} \quad (17)$$

Notice that $$E_q[^{\wedge}z_i] = E_q\left[ \frac{1}{N} \sum_{n=1}^{N} z_n^i \right] = \frac{1}{N} \sum_{n=1}^{N} E_q[z_n^i] = \frac{1}{N} \sum_{n=1}^{N} \phi_{ni}$$

is used for the derivation of the term (17).

A variational expectation-maximization (EM) algorithm may then be employed to estimate the model parameters $\Theta$:

$E$-step:

$$\gamma_i = \alpha_i + \sum_{n=1}^{N} \phi_{ni}$$

$$\phi_{ni} \propto \beta_{iv} \exp\left( \Psi(\gamma_i) - \Psi\left( \sum_{j=1}^{K} \gamma_j \right) + \frac{\lambda}{N} y_i \right)$$

$M$-step:

$$\beta_{ij} \propto \sum_{d=1}^{M} \sum_{n=1}^{N_d} \phi_{dni} w_{dn}^j$$

Dirichlet parameter $\alpha$ can be updated in the M-step by using an efficient Newton-Raphson method in which the inverted Hessian can be computed in linear time.

Prediction

In an example embodiment, WS-LDA may also be used in a prediction process. Specifically, WS-LDA may also be used in calculating the probability $\Pr(c|e)$ for unseen named entities in NERQ. This corresponds to estimating the probability of a topic given a new document w with the already estimated model $\Theta$. The estimation may then be performed by approximating the posterior topic distribution $\theta$ of the new document w using a variational inference procedure.

Exemplary Methods

Methods for recognizing named entities in queries are described with reference to FIGS. 6-8. These methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 6:
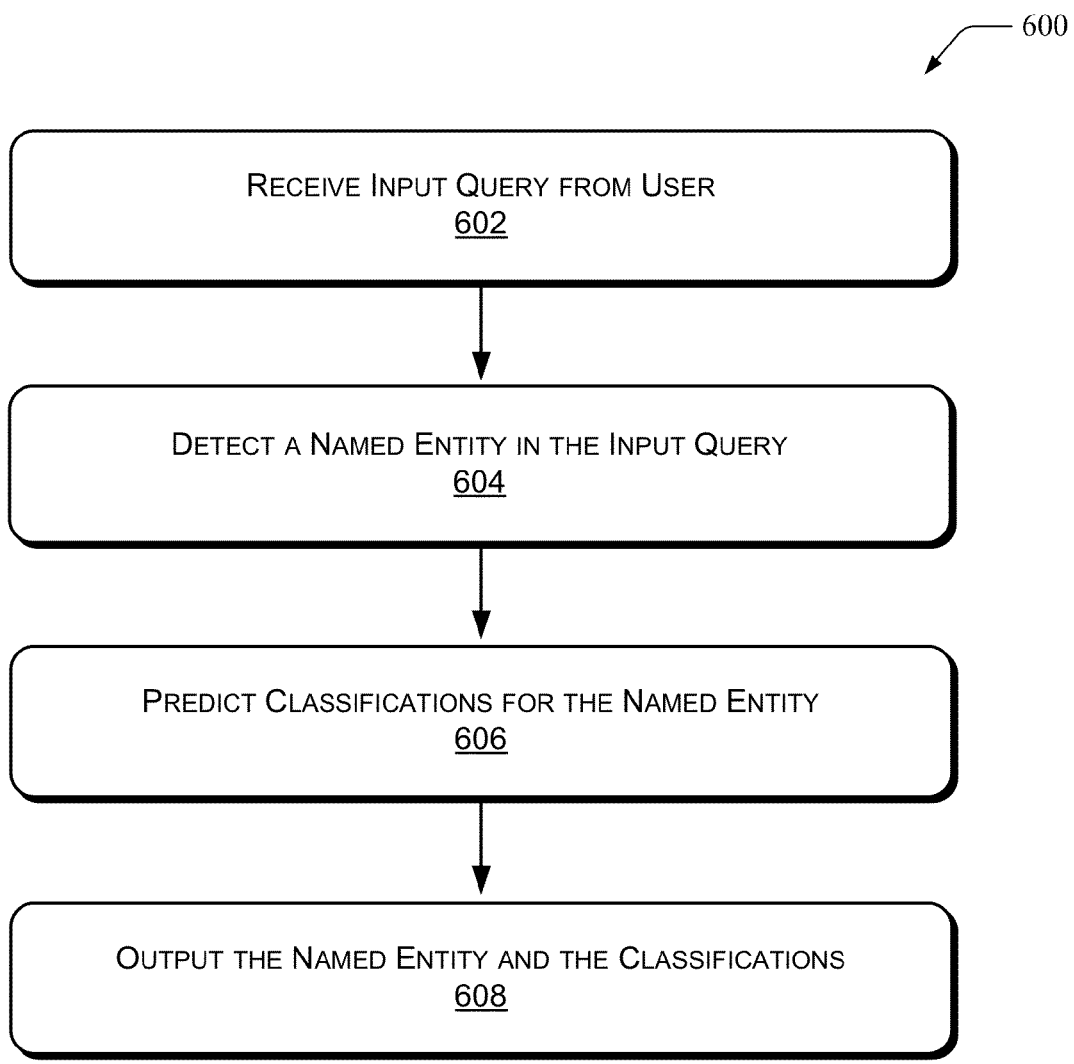
FIG. 6 illustrates an example high-level algorithm for named entity recognition in a query.
Figure 7:
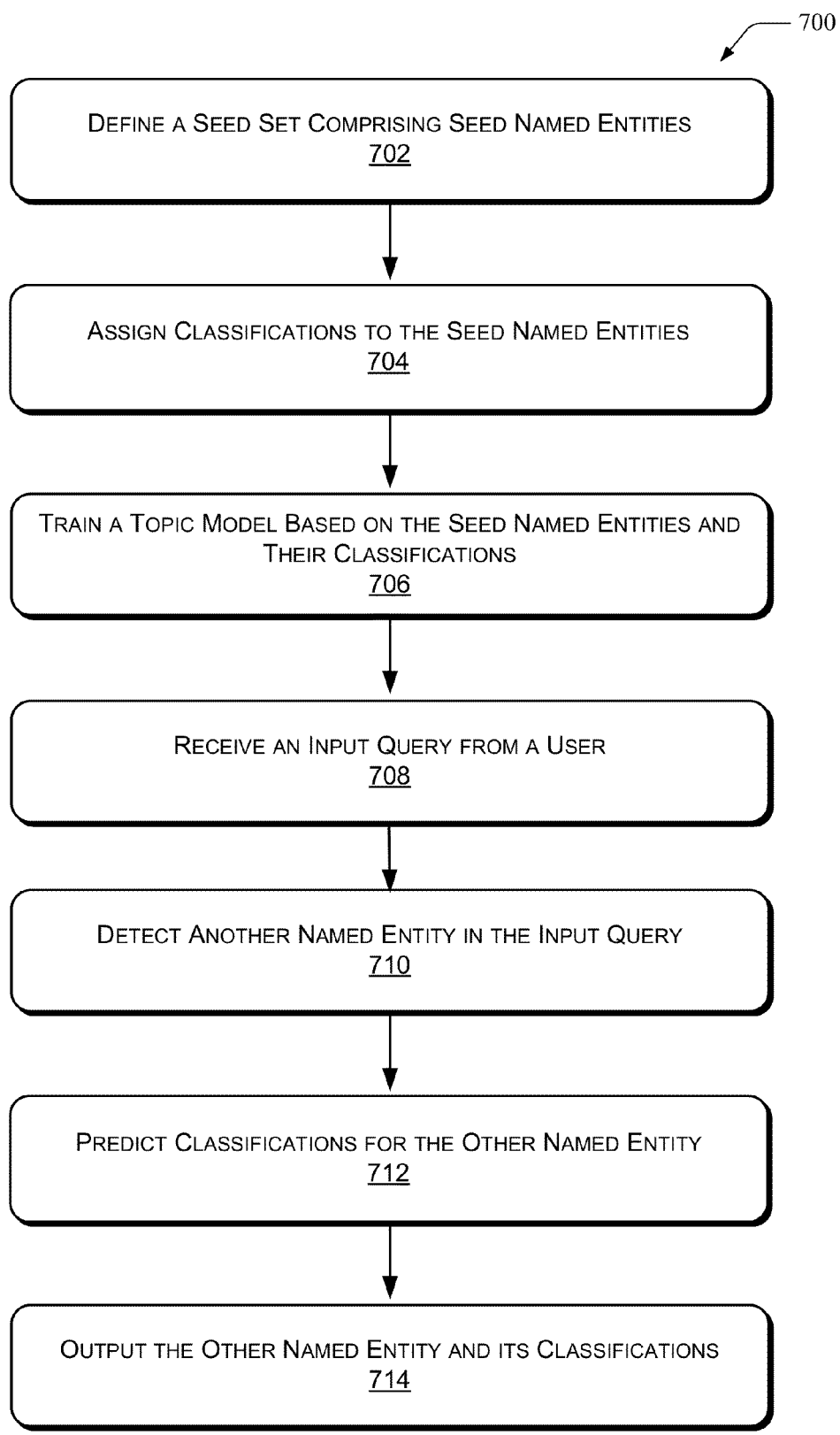
FIG. 7 illustrates an example method of recognizing a named entity in a query and predicting a classification for the named entity.
Figure 8:
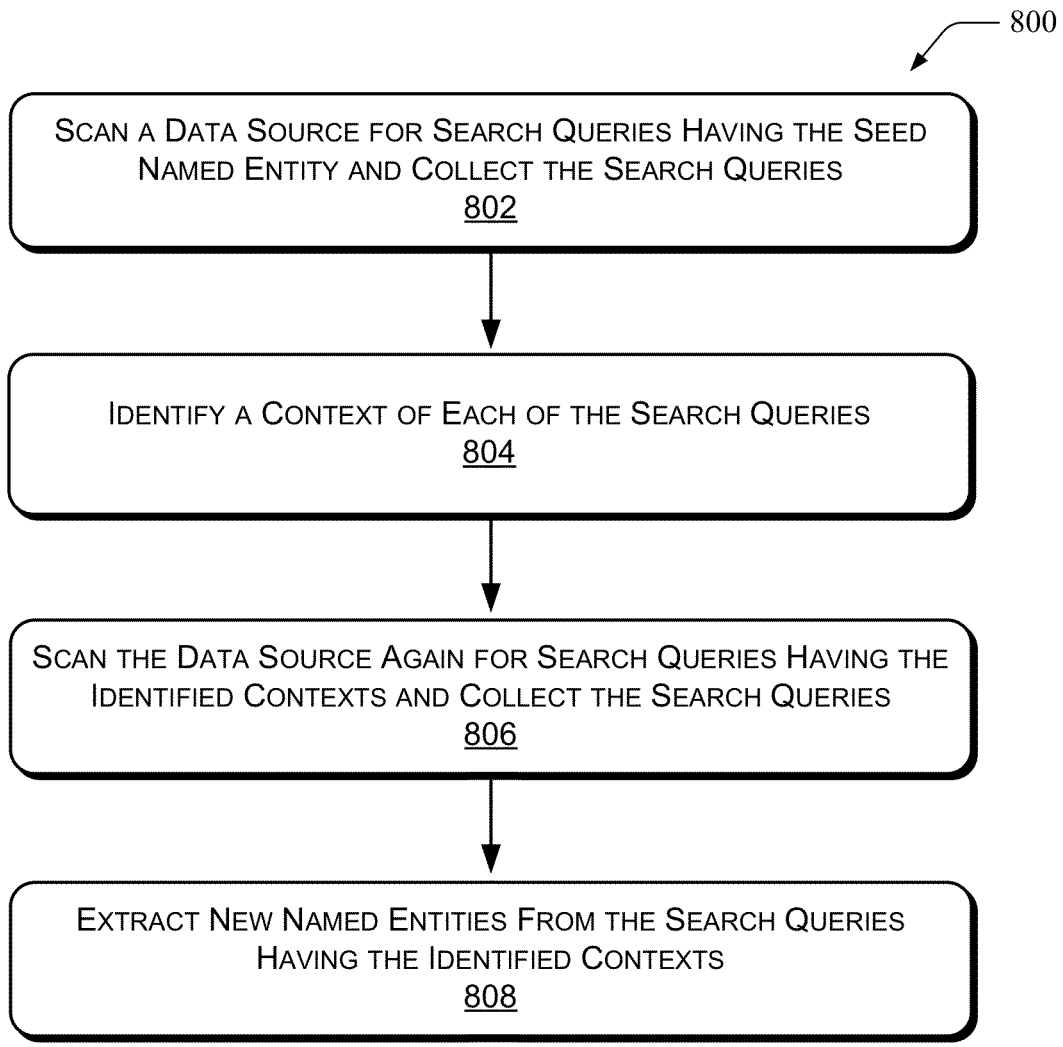
FIG. 8 illustrates an example method of obtaining training data configured to train a topic model for use in the method described in FIG. 7.

The methods described in FIGS. 6-8 may, but need not, be implemented using the environment 100 of FIG. 1. By way of example, the methods are described in the context of environment 100, but are not limited to that environment.

FIG. 6 illustrates an overview of an example method 600 of recognizing a named entity in a query.

At block 602, an input query 118 is received from a user 102. The query 118 may be received directly from the user 102 through an input device, such as a keyboard and/or a mouse at a terminal. For example, the query 118 may be received at the device 104. In an alternate embodiment, the input query 118 may be received indirectly, such as via web input, data transmission over a communications network, data transfer from a storage media device, or the like. For example, the input query 118 may be received from the service 124 via a network connection. The service 124 may be a local service residing on the device 104 such as a local application, may be a remote service residing on the network 106 such as a network-based application or web-based application, or may be a service with portions residing in multiple locations, both locally and remote.

At block 604, a named entity 120 is detected in the input query 118. For example, the named entity 120 may be detected by the recognition module 112.

At block 606, one or more classifications 122 are predicted for the named entity 120. In one embodiment, the classifications 122 that are predicted for the named entity 120 are based on the context of the named entity 120 in the query 118. For example, if a query 118 "harry potter walkthrough" is received at block 602, then the named entity 120 "harry potter" may be detected in the query 118 at block 604, and a likely classification 122 "Game" may be predicted at block 606 based on the context "walkthrough."

At block 608, the named entity 120 and the predicted classifications 122 are output to the user 102. In keeping with the above example, the named entity 120 "harry potter," and the classification 122 "Game" may be output to the user 102. In a case where more than one classification 122 is likely for a named entity 120, then all likely classifications 122 may be output to the user 102. For example, if the input query 118 "pink floyd the wall" is received at block 602, then the named entity 120 "pink floyd" and the classifications 122 "Music" and "Movie" may be output to the user 102 at block 608. Further, the named entity 120 and the classification(s) 122 may be directly output to the user 102, they may be indirectly output to the user 102, or some combination of direct and indirect output. For example, a direct output may include a basic listing of the named entity 120 and the classification(s) 122 on the device 104, and the like. Alternately, an example of an indirect output or a combination may include using the named entity 120 and the classification(s) 122 as part of a ranking mechanism for displaying search results on a web page, such as by relevancy, and the like.

FIG. 7 illustrates a more detailed view of an example method 700 of recognizing a named entity 120 in a query 118 and predicting a classification 122 for the named entity 120. The method 700 may be partially or fully automated. For example, the method 700 described herein may be performed by a recognition module 112 operating on a processor 108 as described above.

At block 702, a seed set 202 of seed named entities 204 is defined. The seed set 202 may be defined from a data set comprising a plurality of search queries. For example, the seed set 202 may originate from queries 206 contained in query logs from commercial web search engines, or the like. In one embodiment, a sample of the queries 206 is selected, and the named entities 204 in the queries 206 are extracted. The seed named entities 204 may be extracted manually from the queries 206, or they may be extracted through an automated process. After extraction, the seed named entities 204 may be collected into a seed set 202.

At block 704, one or more classifications 208 are assigned to the seed named entities 204. In an example embodiment, the classifications 208 are assigned manually, by a human trainer 210. In alternate embodiments, the classifications 208 may be assigned at least partially through automation. As mentioned above, classifications 208 may be assigned to the seed named entities 204 based on the context of the named entity 204 in the query 206. One classification 208 may be assigned to a named entity 204 if only one classification 208 is a likely classification 208 based on the context. Otherwise, multiple classifications 208 may be assigned to a seed named entity 204 if the multiple classifications 208 are all likely for the seed named entity 204 based on the context. The same named entity 204 may be classified differently on subsequent assignments due to differing contexts of the named entity 204 in subsequent queries 206.

Classifications 208 assigned to named entities 204 are based on a predefined taxonomy 212. In one embodiment, the classifications 208 may include "Book," "Movie," "Game," and "Music." In alternate embodiments, additional classifications 208 may be defined in the taxonomy 212. In one embodiment, fewer classifications 208 are defined for assignment to named entities 204.

At block 706, a topic model 216 is trained based on the seed named entities 204 and the classifications 208 assigned to the seed named entities 204. In an example embodiment, the topic model 216 is trained offline as described above, using a WS-LDA 226 learning method. More on this process will be described below with reference to FIG. 8.

At block 708, an input query 118 is received from a user 102 as described above with reference to FIG. 6. At block 710, another named entity 120 is detected in the input query 118 based on the topic model 216 trained in block 706. At block 712, one or more classifications 122 are predicted for the other named entity 120 using the topic model 216 trained in block 706. In one embodiment, the classifications 122 that are predicted for the other named entity 120 are based on the context of the other named entity 120 in the query 118. In an example embodiment, the prediction of the classifications 122 for the other named entity 120 is based on a probability function as described above.

At block 714, the other named entity 120 and the predicted classification(s) 122 for the other named entity 120 are output to the user 102. The output of the other named entity 120 and the predicted classification(s) 122 for the other named entity 120 may be output to the user 102 either directly or indirectly as described above.

FIG. 8 illustrates an example method 800 of obtaining training data 214 configured to train a topic model 216 for use in the method described in FIG. 7. In alternate embodiments, training data 214 for training the topic model 216 described with respect to FIG. 7 may be obtained by other processes. In one embodiment, the training data 214 may be obtained using a data source 218 containing search queries.

In one embodiment, the data source 218 may be query log data 220, such as a query log from a commercial web search engine, or the like. In another embodiment, the data source 218 may be click through data 222. Click through data 222 comprises queries and the associated Uniform Resource Locator (URL) associated with results of the queries, where the URLs have been "clicked on" or otherwise selected by the users 102 who input the queries. As discussed above, click through data 222 may provide an additional level of confidence in a result of a query. This is because the user 102 subsequently selected the result (a URL) after it was presented to the user following a search. If several results are presented to a user 102 following an input query, a URL clicked on by the user 102 is more likely what the user 102 was searching for when he input the query. This may be considered to be leveraging the wisdom of the crowds, and may strengthen the training data 214 used to train a topic model 216.

Furthermore, in the click-through data 222, the contexts of named entities in queries and the websites of associated URLs may provide rich clues for identifying the classes of named entities. One example application may be in resolving ambiguities. For example, if named entities are associated with the website "IMDb.com" in the click-through data, then they are likely to be movies, since the website "IMDb.com" is a movie database website (The Internet Movie Database).

At block 802, in one implementation, a data source 218 is scanned for search queries having the seed named entities 204. As discussed above, the data source 218 may be query log data 220, such as a query log from a commercial web search engine, click through data 222, or the like. The data source 218 is scanned, and all search queries in the data source 218 that contain the seed named entities 204 are collected. Additionally, as the search queries are collected, the frequency of occurrence of a particular seed named entity 204 may be calculated. The total frequency of queries containing the seed named entity 204 in the query log may be used to approximate the probability of occurrence of the seed named entity 204. In general, the more frequently the seed named entity 204 occurs, the larger probability Pr(e) will be.

At block 804, the contexts of the search queries collected at block 802 are identified. As discussed above, this process may comprise removing the seed named entity 204 from the search query, and taking the remainder as the context of the seed named entity 204. In other embodiments, this process may be more refined, with limitations placed on the words identified as context for the seed named entity 204 in the query.

At block 806, the data source 218 used in block 802 is scanned again for search queries having the contexts identified in block 804. The search queries having the identified contexts may then be collected. In an alternate embodiment, a different data source 218 than that used in block 802 and 804 may be used to perform the step of block 806.

At block 808, new named entities 224 are extracted from the search queries collected in block 806. These new named entities 224 are those having the contexts identified in block 804. Thus, these new named entities 224 extracted based on context in queries are used to train the topic model 216 as described in FIG. 7.

Any of the acts of any of the methods described herein may be implemented at least partially by a processor or other electronic device based on instructions stored on one or more computer-readable media. Computer-readable media can be any available media that can be accessed during computation of resource bounds. By way of example, and not limitation, computer-readable media may comprise volatile and non-volatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

CONCLUSION

Although this disclosure uses language specific to structural features and/or methodological acts, the disclosure is not necessarily limited to the specific features or acts described. Rather, the specific features and acts are disclosed as example forms of implementing various embodiments.

What is claimed is:

1. A computer-implemented method of recognizing named entities in a query with a recognition module operating on a processor, the method comprising:
    receiving an input query from a user;
    detecting a named entity in the input query;
    representing the input query as one or more triples (e, t, c), wherein e represents the detected named entity, t represents a context of the detected named entity, and c represents a classification for the detected named entity that is determined based at least in part on a trained probabilistic topic model and a predefined taxonomy;
    calculating a joint probability for individual ones of the one or more triples;
    identifying a largest joint probability associated with a respective one of the one or more triples;
    predicting an assigned classification for the detected named entity based at least in part on the identified largest joint probability; and
    outputting the detected named entity and the assigned classification to the user.

2. The method of claim 1, wherein multiple classifications are predicted for the detected named entity based on the trained probabilistic topic model and the predefined taxonomy.

3. The method of claim 1, wherein the trained probabilistic topic model is trained using a Weakly Supervised Latent Dirichlet Allocation (WS-LDA) learning method, the WS-LDA learning method comprising determining, by a human, that the detected named entity can belong to the classification.

4. The method of claim 1, wherein the representing the input query as one or more triples (e, t, c) comprises determining that a plurality of triples (e, t, c) represent the input query by:
    determining multiple possible ways of segmenting the input query into at least one named entity and at least one context;
    labeling the at least one named entity with multiple possible classes for the multiple possible ways of segmenting the input query; and
    determining the plurality of triples (e, t, c) that represent the input query as a set of unique triples that are formed by the multiple possible ways of segmenting the query and the multiple possible classes.

5. A method of recognizing named entities in a query with a recognition module operating on a processor, the method comprising:
    defining a seed set comprising a seed named entity;
    assigning a classification to the seed named entity based on a predefined taxonomy;
    training a probabilistic topic model based on the seed named entity and the classification;
    receiving an input query from a user;
    detecting, by the processor, another named entity in the input query;
    representing the input query as one or more triples (e, t, c), wherein e represents the detected other named entity, t represents a context of the detected other named entity, and c represents a particular classification for the detected other named entity that is determined based at least in part on the trained probabilistic topic model and the predefined taxonomy;
    calculating a joint probability for individual ones of the one or more triples;
    identifying a largest joint probability associated with a respective one of the one or more triples;
    predicting, by the recognition module, an assigned classification for the detected other named entity based at least in part on the identified largest joint probability; and
    outputting the detected other named entity and the assigned classification to the user.

6. The method of claim 5, wherein the classification assigned to the seed named entity is assigned manually, and wherein the probabilistic topic model is trained using a Weakly Supervised Latent Dirichlet Allocation (WS-LDA) learning method, the WS-LDA learning method comprising determining, by a human, that the detected named entity can belong to the classification.

7. The method of claim 5, wherein the seed set is selected based at least in part on a data set comprising a plurality of search queries.

8. The method of claim 5, wherein a plurality of classifications is assigned to the seed named entity.

9. The method of claim 5, further comprising generating training data, the generating comprising:
    scanning a data source for a first search query having the seed named entity;
    collecting the first search query having the seed named entity;
    identifying an associated context of the first search query having the seed named entity;
    scanning the data source for a second search query having the associated context;
    collecting the second search query having the associated context; and
    extracting a new named entity from the second search query having the associated context.

10. The method of claim 9, wherein the data source is a click-through data set comprising queries received and selected Uniform Resource Locators (URLs) associated with the queries received.

11. The method of claim 9, wherein the associated context comprises a remainder of the first search query other than the seed named entity.

12. The method of claim 9, wherein the collecting the first search query further comprises calculating a frequency of occurrence for the seed named entity in the data source.

13. The method of claim 9, further comprising:
estimating a probability $P_r(c|e)$ for the seed named entity and estimating a probability $P_r(t|c)$ for the classification,
wherein c represents the classification, e represents the seed named entity, and t represents the associated context of the first search query.

14. The method of claim 9, further comprising:
estimating probabilities $P_r(c|e)$ and $P_r(e)$ for the new named entity while a probability $P_r(t|c)$ is a fixed constant,
wherein c represents the classification, e represents the new named entity, and t represents the associated context of the second search query.

15. The method of claim 14, wherein the estimating $P_r(c|e)$ and $P_r(e)$ for the new named entity is performed at least in part using Weakly Supervised Latent Dirichlet Allocation (WS-LDA) comprising a determination, by a human, that the new named entity can belong to the classification.

16. The method of claim 9, further comprising collecting the extracted new named entity based on a heuristic threshold, wherein the new named entity is collected if the new named entity appears with at least a predefined number of unique contexts.

17. A system comprising:
a memory; and
a processor coupled to the memory, the processor executing components comprising:
an offline training component configured to:
construct training data comprising a first named entity and a classification for the first named entity, and
train a probabilistic topic model based on the first named entity and the classification for the first named entity using a weakly supervised learning method; and
an online prediction component configured to:
detect another named entity in an input query,
represent the input query as one or more triples (e, t, c), wherein e represents the detected other named entity, t represents a context of the detected other named entity, and c represents a particular classification for the detected other named entity that is determined based at least in part on the trained probabilistic topic model and a predefined taxonomy,
calculate a joint probability for individual ones of the one or more triples,
identify a largest joint probability associated with a respective one of the one or more triples,
predict an assigned classification for the detected other named entity based at least in part on the identified largest joint probability, and
output the detected other named entity and the assigned classification for the detected other named entity to a user.

18. The system of claim 17, wherein the constructing training data comprises:
defining a seed set from a data set comprising a plurality of search queries, the seed set comprising a seed named entity;
receiving, at least in part from a human, the classification for the seed named entity based on the predefined taxonomy;
scanning a data source for a first search query having the seed named entity;
collecting the first search query having the seed named entity;
identifying an associated context of the first search query having the seed named entity;
scanning the data source for a second search query having the associated context;
collecting the second search query having the associated context; and
extracting the first named entity from the second search query having the associated context.

19. The system of claim 18, wherein the data source is a click-through data set comprising queries received and clicked Uniform Resource Locators (URLs) associated with the queries received.

20. The system of claim 17, wherein
the weakly supervised learning method is a Weakly Supervised Latent Dirichlet Allocation (WS-LDA) learning method comprising determining, by a human, that the first named entity can belong to the classification for the first named entity.

* * * * *